United States Patent [19]

Youngren

[11] 4,382,700
[45] May 10, 1983

[54] SHELF LIFE INDICATOR

[76] Inventor: Fred R. Youngren, 31 Highland Ave., Lexington, Mass. 02173

[21] Appl. No.: 196,751

[22] Filed: Oct. 14, 1980

[51] Int. Cl.³ .............................................. G01K 3/06
[52] U.S. Cl. .................................... 374/102; 116/216; 368/327; 374/161; 426/88
[58] Field of Search .................. 116/219, 216; 73/356, 73/358, 339 R; 368/327; 426/88

[56] References Cited

U.S. PATENT DOCUMENTS

| | | | |
|---|---|---|---|
| 2,490,933 | 12/1949 | Tornquist et al. | 73/558 |
| 2,552,477 | 5/1951 | Cole | 73/339 R |
| 2,716,065 | 8/1955 | Beckett | 116/219 |
| 2,951,764 | 9/1960 | Chase | 99/192 |
| 3,118,774 | 1/1964 | Davidson et al. | 99/192 |
| 3,242,733 | 3/1966 | Johnson | 73/358 |
| 3,243,303 | 3/1966 | Johnson | 99/192 |
| 3,420,205 | 1/1969 | Morison | 73/339 R |
| 3,479,877 | 11/1969 | Allen | 73/358 |
| 3,480,402 | 11/1969 | Jackson | 23/254 |
| 3,592,059 | 7/1971 | Chilton | 73/362.8 |
| 3,851,529 | 12/1974 | Andrews | 73/362.8 |
| 3,932,134 | 1/1976 | Fang et al. | 23/253 |
| 3,946,611 | 3/1976 | Larrson | 73/356 |
| 3,981,683 | 9/1976 | Larsson | 73/356 |
| 3,996,007 | 12/1976 | Fang et al. | 23/253 |

OTHER PUBLICATIONS

*Experience with T-T Indicators*, by A. Kramer.
*Criteria for the Application of T-TI Indicators to Quality Control of Deep Frozen Food Products*, by H. Schubert, 1977.
*Performance of Frozen Food Indicators Subjected to Time Variable Temperatures*, by Kan-Ichi Hayakawa from ASHRAE Journal, 4/74.
*Current Status of the Theory of the Application of Temperature Indicators, Temperature Integrators, and Temperature Function Integrators to the Food Spoilage Chain*, by J. Olley-International Journal of Refrigeration-7/78.
*Temperature Indicators-The State of the Art*, by C. Byrne from Food Technology, 6/76.
Information Sheets by Minnesota Mining & Manufacturing Company and U.S. Pat. No. 3,954,011 by Manske.
*TKI Kit Instructions for Constructing TSI\**, Devices by Mirco-Circuits Co., Inc., 1979, *Timer/Sensor/Integrator.
*Time-Temperature Indicators in Monitoring the Distribution of Frozen Foods*, by John W. Farquhar-8/15/77.

Primary Examiner—Edward R. Kazenske
Assistant Examiner—Denis E. Corr
Attorney, Agent, or Firm—Hamilton, Brook, Smith & Reynolds

[57] ABSTRACT

An indicator attached to perishable goods to show the remaining useful life are described. The preferred embodiment described includes a material, as for example a mineral jelly, which is in contact with a wick, such as a paper strip, such that the mineral jelly diffuses into the paper in accordance with changes in ambient temperature over a period of time. The amount of diffusion is indicated by an apparent change in color of the paper and is analogous to a change in the useful characteristic of the perishable goods.

2 Claims, 5 Drawing Figures

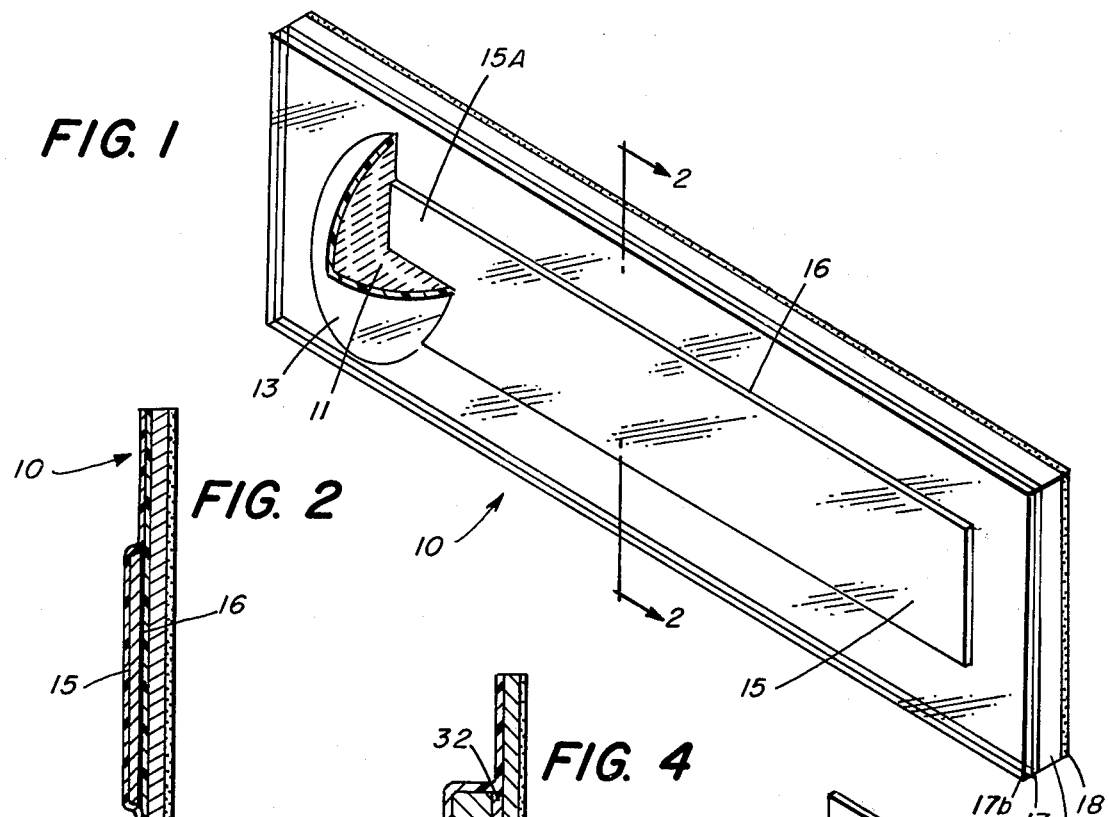

SHELF LIFE INDICATOR

DESCRIPTION

1. Technical Field

The technical field of this invention is time-temperature integrating indicators which are used to display and predict the remaining useful life of goods subject to spoilage or deterioration.

2. Background Art

It has been standard practice for a great many years to keep perishable goods such as milk cooled to prevent it from turning "sour" and becoming spoiled In recent times milk containers have been dated at the time they are filled to indicate the last date for sale. Spoilage is assumed to occur several days beyond the last date for sale.

Unfortunately, the vagaries of shipping and handling often subject certain cartons of milk to temperatures which accelerate its deterioration. Under these temperature conditions the milk in these cartons will degrade at a more rapid rate and will spoil before the date indicated. The individual spoilage depends upon the individual environment experienced by each milk container. A further set of temperature variables is introduced by the consumer of the milk. The trip from the store to refrigerator introduces another temperature environment. In the home, the milk may be left at room temperature by individual users. All of the above variables contribute to the unreliability of the data stamped on the carton as an indicator of the freshness of the milk.

A similar problem exists with respect to the storage of blood plasma wherein donated blood must be kept refrigerated between 1° C. and 10° C. during transport. Blood stored at between 1° C. and 6° C. will exceed 10° C. in about 30 minutes in ambient narrow temperature conditions and should not be used thereafter.

Various temperature indicators have been proposed in the patent literature. U.S. Pat. No. 3,996,007 shows a time-temperature indicator in which an ampule of gas is disposed either within a gas permeable wall or a rate controlling film adjacent to a wick. The rate at which the gas permeates through the rate controlling film is temperature dependent. An indicator composition is deposited on the wick which produces a color change in the presence of gas. The device provides a time integral of temperature displayed by the color front advancing in the wick. The distance of the front advancement is a function of the temperature-time interval.

The use in the 007' patent of a gas which diffuses through a porous membrane introduces undesirable features. First, the gas must be contained in an ampule. Before the indicator is used the ampule must be broken. The membrane may be punctured when the ampule is broken.

Another approach to this problem is suggested in U.S. Pat. No. 3,118,774. The U.S. Pat. No. 3,118,774 patent teaches the use of a frozen blob of hydrocarbon oils and waxes concealed by a permeable member of appropriate thickness as a temperature responsive element. However, the 774' device does not indicate shelf life remaining. It shows only two states, good or bad; with no indication of how soon the product will spoil.

A more complex structure is shown in the Shelf Life Indicator of U.S. Pat. No. 3,243,303 which comprises a fluid composition of water and an emulsion of polyvinyl acetate and a colored dye impregnated into a fluid carrier such as gauze. The fluid is initially immobilized by freezing. When warmed above a predetermined temperature the fluid travels to an indicating area over a predetermined time. The variable rate of fluid travel is not matched to the variable rate of decomposition of the product which occurs when the temperature of the product is greatly varied above the freezing point. Thus, the sensor essentially monitors only the time that the product exceeds some "thaw" temperature, and therefore it is useful over only a limited range of temperatures above that point. It is essentially a device which is applied to products which are kept frozen. It integrates time above the thaw temperature but does not have the fluid travel-rate vary with temperature to indicate an analog of remaining shelf life.

INVENTION DISCLOSURE

In view of the foregoing, a need still exists for an integrating indicator to show the condition and life expectancy of perishable goods. This indicator should be inexpensive to manufacture and simple to use by the consumer. Such a device is described below.

This invention comprises an integrating indicator having (a) a mass of material whose viscosity decreases with increased temperature; (b) a wick of porous paper through which the viscous material will flow by capillary action; and (c) indicating means on the back side of the porous paper. The flow of viscous material along the porous wick of paper causes the paper to become translucent. When the wick becomes translucent it exhibits an apparent color change due to indicating means on its back side. This indicator shows the amount of heating of the container over a period of time. By proper calibration of the indicator, an analog of the condition of the perishable goods in the container is created.

DESCRIPTION OF FIGURES

FIG. 1 is an isometric view, partially cut away, of an integrating indicator according to a first embodiment of this invention;

FIG. 2 is a view showing a cross-section through line 2—2 of FIG. 1;

FIG. 3 is an isometric view, partially cut away, of an integrating indicator according to a second embodiment of this invention;

FIG. 4 is a view showing a cross-section through line 3—3 of FIG. 3; and

FIG. 5 is an isometric view which shows the invention of FIGS. 1 and 2 mounted on a milk carton.

BEST MODE CONTEMPLATED

Referring now particularly to FIG. 1, an integrating indicator 10 according to this invention is shown to include a mass of petrolatum or petroleum jelly 11 (types of which will be identified hereinafter) disposed within a hemispherical capsule 13. Suffice it is to say here that mineral jelly 11 is a colloidal system of non-straight-chain solid hydrocarbons and high boiling liquid hydrocarbons, in which most of the liquid hydrocarbons are held inside the micelles. It may be categorized as a gelatinous, oily, semi-solid amorphous mass whose consistency, and hence viscosity, varies with temperature. It therefore is a less active (in the sense of changing properties) material at low temperatures while becoming more active at room temperatures. A paper wick 15, which has one end 15A immersed in the mineral jelly 11 has properties such that it becomes translucent when it has absorbed the mineral jelly 11. The back side 16 of the paper wick 15 is colored. Both the capsule 13 containing the mineral jelly 11 and the paper wick 15 are mounted on a self-sticking label 14, but separated from label 14 by a layer of transparent tape 17a which is impervious to the mineral jelly 11. A second impervious layer of transparent tape 17b completely covers the paper wick 15 and the capsule 13 to protect them from contamination.

Referring now to FIG. 5 the integrating indicator 10 is shown to be attached to the sloping top surface 21 of a milk carbon 23. The viscosity of the mineral jelly 11 varies with the ambient temperature. During periods of higher temperature, when the viscosity of the mineral jelly 11 decreases, the mineral jelly 11 diffuses faster into the paper wick 15. This movement is displayed by a change in translucency of the paper wick 15 which allows the colored back side 16 to show through the paper wick 15. When the temperature drops, the viscosity increases and the rate of diffusion of the material jelly 11 into the paper wick 15 is decreased. Thus, over a period of time, the diffusion of the mineral jelly 11 into the paper wick 15 is indicative of the number, length and degree of the periods of warm temperature to which the integrating indicator 10 is subjected. The position of the diffusion boundary in turn then is an indication of the state of the contents within the container.

As mentioned above, the mineral jelly 11 is in effect a less active material at low temperatures and a more active material at room temperatures. Such a material is a petrolatum type of "mineral jelly" produced by Chesebrough-Ponds, Inc., 33 Benedict Place, Greenwich, Conn., 06830, and is marketed under the name Vaseline ® Intensive Care ® Cream. I have found the above-referenced form of petrolatum to be particularly suitable inasmuch as it can produce diffusion rates from 2 inches/day to 0.01 inches/day over a temperature range of 70° F. to −15° F. This rate is to be compared with prior art liquid or gas diffusers with diffusion rates of 0.2 inches/hour to 0.06 inches/hour over temperature ranges of 95° F. to 23° F. Such prior art sensors are completely unsuited for indicating shelf life of milk which requires an indicator whose diffusion rate changes by two orders of magnitude (100 times) when storage temperature is varied from 70° F. to 32° F. It will be appreciated, however, that there are many other fatty semi-solid mixtures of paraffin hydrocarbons with different melting points and viscosities which may be blended to obtain any desired diffusion rate within wide limits over a wide range of temperature depending upon the particular desired range of an integrating indicator of the type here contemplated.

Referring now to FIGS. 3 and 4, an alternate embodiment of this invention is shown to comprise an arrangement wherein exposure to temperature causes a colored strip to be uncovered to indicate shelf life. Thus in FIG. 3 a mass 30 of ablative material is disposed to cover a colored strip 32. The mass 30 is tapered such that it varies in thickness along its length from a wide thickness at 30A to a narrow thickness at 30B. The colored strip 32 is mounted on a self-sticking label 33. When the temperature of the ablative material 30 is elevated, its rate of ablation is increased, which increases the rate at which the colored strip 32 is exposed starting from the end 30B where the thickness of the ablative material 30 is minimum. The rate of exposure of the colored strip 32 is a function of both time and temperature. Over a period of time, the cumulative exposure of the colored strip 32 is in effect an analog of the integral over time of the temperature experienced by the ablative material 30. Completing the illustrated arrangement is a transparent but perforated cover 44 which may comprise well-known plastic encapsulating materials positioned as shown to protect the device from damage. The perforations 46 allows the gas evolved from the ablative material 30 to escape.

The mass 30 of ablative material is of the class of solid materials which has a sufficiently high vapor pressure to sublime, i.e., to convert, directly from a solid to a vapor. Such a material is napthalene produced by Para Industries, Inc., P.O. Box 1888, Paterson, N.J., 07509. It will be appreciated however that there are many other ablative materials, such as, Benzoquinone, Camphor, Di-iode Ethylene and 2 Butyl-4 Methyl Phenol, with different vapor pressure functions of temperature which may be selected or blended to obtain any desired range of ablation within wide limits, depending upon the particular desired range of an integrating indicator of the type here contemplated.

Having described a preferred embodiment of this invention as shown in FIG. 1, it will now be apparent to one of skill in the art that changes may be made without departing from the concept of using changes in viscosity and diffusion with temperature of particular materials to provide an integrating indicator. For example, the physical size of the indicator can be varied to change the operating time. Further, it will also be appreciated that the color indicator can be a dye mixed into the semi-solid material 10 rather than the colored backside 16 of the paper wick 15 as described. Thus the paper wick 15 would change color as the diffusion process carries the colored dye into the paper wick 15. It is also clear that the wick 15 can be fabricated from many materials other than paper to obtain further control over the diffusion rate properties. The shape of the wick 15 need not be limited to the rectangular strip shown in FIG. 1 but in outline can be circular, triangular, logarithmic and other geometric shapes or may be varied in thickness to gain further control over the diffusion process. The porosity of the wick may also be controlled by mechanical, chemical, pre-impregnation or other means to provide further control over the diffusion process.

Finally, it should be obvious that both embodiments could be modified to be fabricated directly on the carton or container rather than be fabricated as a separate device on a self-sticking label. It is felt, therefore, that this invention should not be restricted to the disclosed embodiments, but rather should be limited only by the spirit and scope of the appended claims.

I claim:

1. An indicator comprising:
   (a) a mass of ablative material whose ablation rate is a direct function of temperature;
   (b) a colored strip disposed on one side of the ablative material such that as the ablative material evaporates, the strip is progressively exposed; and
   (c) means for holding the ablative material in position over the colored strip while allowing the evaporative products of the material to escape to the atmosphere.

2. An indicator for measuring the useful life of a perishable item within a container comprising:
   (a) a material in the non-gaseous state whose rate of evaporation is a function of temperature;

(b) a porous strip tapered in thickness which is made translucent by being impregnated with said material;

(c) a colored strip disposed on the back side of the porous strip such that as the material evaporates from the porous strip the translucence of the porous strip decreases, thereby progressively obscuring the colored strip; and, (d) means for holding the porous strip in position over the colored strip and allowing the evaporative products of the material to escape to the atmosphere.

* * * * *